US009262972B2

(12) United States Patent
Fujimori et al.

(10) Patent No.: US 9,262,972 B2
(45) Date of Patent: Feb. 16, 2016

(54) METHOD FOR CONTROLLING ELECTRO-OPTIC DEVICE, DEVICE FOR CONTROLLING ELECTRO-OPTIC DEVICE, ELECTRO-OPTIC DEVICE, AND ELECTRONIC APPARATUS

(71) Applicant: SEIKO EPSON CORPORATION, Tokyo (JP)

(72) Inventors: Keitaro Fujimori, Fujimi-machi (JP); Takafumi Sano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 381 days.

(21) Appl. No.: 13/948,816

(22) Filed: Jul. 23, 2013

(65) Prior Publication Data

US 2014/0028660 A1 Jan. 30, 2014

(30) Foreign Application Priority Data

Jul. 25, 2012 (JP) ................................. 2012-164465

(51) Int. Cl.

| | |
|---|---|
| ***G06F 3/038*** | (2013.01) |
| ***G09G 5/00*** | (2006.01) |
| ***G09G 3/34*** | (2006.01) |
| ***G09G 3/20*** | (2006.01) |

(52) U.S. Cl.

CPC .............. *G09G 3/344* (2013.01); *G09G 3/2018* (2013.01); *G09G 2310/0254* (2013.01); *G09G 2320/0276* (2013.01); *G09G 2320/046* (2013.01); *G09G 2340/16* (2013.01); *G09G 2380/02* (2013.01)

(58) Field of Classification Search

None

See application file for complete search history.

(56) References Cited

U.S. PATENT DOCUMENTS

| | | | |
|---|---|---|---|
| 2005/0001812 | A1 | 1/2005 | Amundson et al. |
| 2005/0024353 | A1 | 2/2005 | Amundson et al. |
| 2005/0062714 | A1 | 3/2005 | Zehner et al. |
| 2005/0152018 | A1 | 7/2005 | Abramson et al. |
| 2005/0179642 | A1 | 8/2005 | Wilcox et al. |
| 2005/0270261 | A1 | 12/2005 | Danner et al. |
| 2005/0280626 | A1 | 12/2005 | Amundson et al. |
| 2006/0202949 | A1 | 9/2006 | Danner et al. |
| 2006/0262060 | A1 | 11/2006 | Amundson |
| 2007/0091418 | A1 | 4/2007 | Danner et al. |
| 2007/0146306 | A1 | 6/2007 | Johnson et al. |
| 2007/0200874 | A1 | 8/2007 | Amundson et al. |
| 2008/0129667 | A1 | 6/2008 | Zehner et al. |
| 2008/0309953 | A1 | 12/2008 | Feng |
| 2009/0195568 | A1 | 8/2009 | Sjodin |
| 2009/0256799 | A1 | 10/2009 | Ohkami et al. |
| 2011/0187684 | A1 | 8/2011 | Amundson et al. |
| 2011/0193841 | A1 | 8/2011 | Amundson et al. |
| 2011/0199671 | A1 | 8/2011 | Amundson et al. |

FOREIGN PATENT DOCUMENTS

WO 2005/101363 A2 10/2005

*Primary Examiner* — Nicholas Lee

(74) *Attorney, Agent, or Firm* — Maschoff Brennan

(57) ABSTRACT

A method for controlling an electro-optic device switches between a first driving scheme for changing an optical state between a-number of optical states and a second driving scheme for changing an optical state between b-number of optical states (b>a). In the first driving scheme, an integrated value W (A→B) of drive voltage and drive time when changing an optical state A to an optical state B, and an integrated value W (B→A) of drive voltage and drive time when changing the pixel from the optical state B to the optical state A satisfy a relation of W (A→B)=−W (B→A), and the integrated value W (A→B) and W (B→A) for the optical state A and B in the second driving scheme are equal to the integrated value W (A→B) and W (B→A) in the first driving scheme, respectively.

12 Claims, 14 Drawing Sheets

| Gray LEVEL | WHT |
|---|---|
| 0 | 0 |
| 1 | 3 |
| 2 | 5 |
| 3 | 6 |
| 4 | 9 |
| 5 | 10 |
| 6 | 10 |
| 7 | 10 |

FIG. 9

| | | Gray level value | | | | | | | | | | | | | | | |
|---|---|---|---|---|---|---|---|---|---|---|---|---|---|---|---|---|---|
| Driving scheme | | 0 | 1 | 2 | 3 | 4 | 5 | 6 | 7 | 8 | 9 | 10 | 11 | 12 | 13 | 14 | 15 |
| $\alpha$ | 16 gray levels | 0 | 1 | 2 | 3 | 4 | 5 | 6 | 7 | 8 | 9 | 10 | 11 | 12 | 13 | 14 | 15 |
| $\beta$ | 8 gray levels | 0 | | 1 | | 2 | | 3 | | | 4 | | 5 | | 6 | | 7 |
| $\gamma$ | 4 gray levels | 0 | | | | 1 | | | | | | | 2 | | | | 3 |
| $\delta$ | 2 gray levels | 0 | | | | | | | | | | | | | | | 1 |

FIG. 10

α
| Gray level | WHT |
|---|---|
| 0 | 0 |
| 1 | 3 |
| 2 | 5 |
| 3 | 6 |
| 4 | 7 |
| 5 | 8 |
| 6 | 8 |
| 7 | 9 |
| 8 | 9 |
| 9 | 9 |
| 10 | 10 |
| 11 | 10 |
| 12 | 10 |
| 13 | 10 |
| 14 | 10 |
| 15 | 10 |
β
| Gray level | WHT |
|---|---|
| 0 | 0 |
| | |
| 1 | 5 |
| | |
| 2 | 7 |
| | |
| 3 | 8 |
| | |
| | |
| 4 | 9 |
| | |
| 5 | 10 |
| | |
| 6 | 10 |
| | |
| 7 | 10 |
γ
| Gray level | WHT |
|---|---|
| 0 | 0 |
| | |
| | |
| | |
| 1 | 7 |
| | |
| | |
| | |
| | |
| | |
| | |
| 2 | 10 |
| | |
| | |
| | |
| 3 | 10 |
δ
| Gray level | WHT |
|---|---|
| 0 | 0 |
| | |
| | |
| | |
| | |
| | |
| | |
| | |
| | |
| | |
| | |
| | |
| | |
| | |
| | |
| 1 | 10 |
FIG. 11
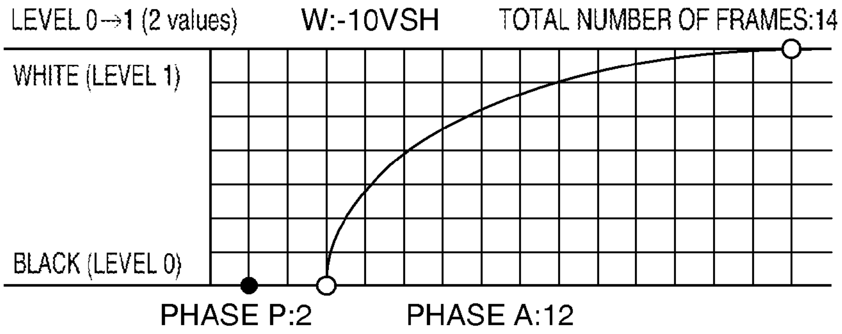
FIG. 12
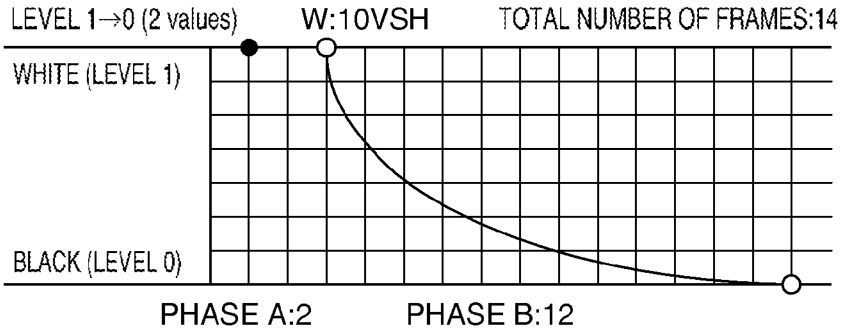
FIG. 13

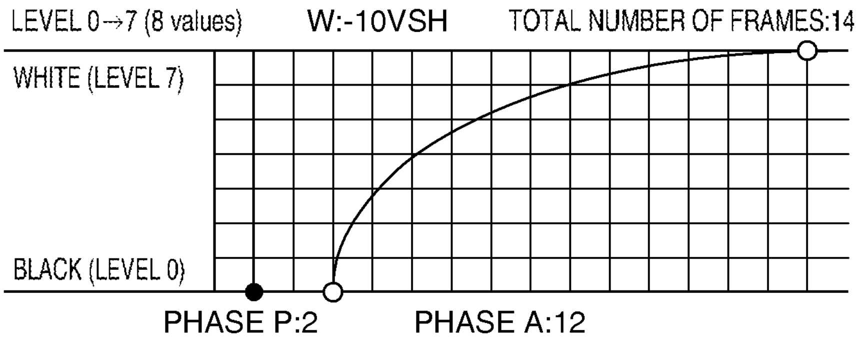
FIG. 14
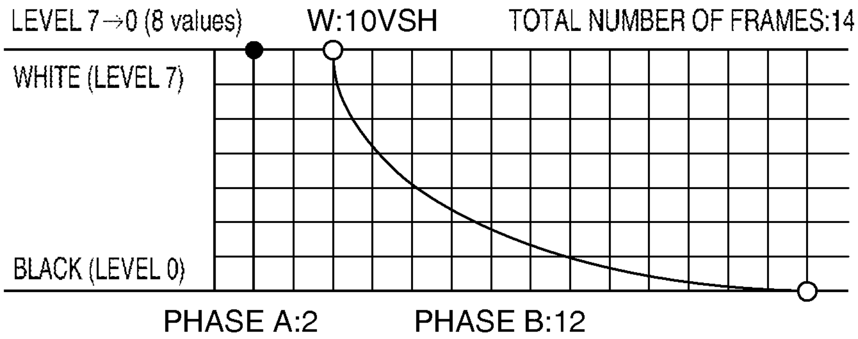
FIG. 15
| Gray level | WHT |
|---|---|
| 0 | 0 |
| 1 | 3 |
| 2 | 5 |
| 3 | 6 |
| 4 | 9 |
| 5 | 10 |
| 6 | 11 |
| 7 | 12 |
FIG. 16

| Gray level | WHT |
|---|---|
| 0 | 0 |
| | |
| | |
| | |
| | |
| | |
| | |
| 1 | 10 |
FIG. 17
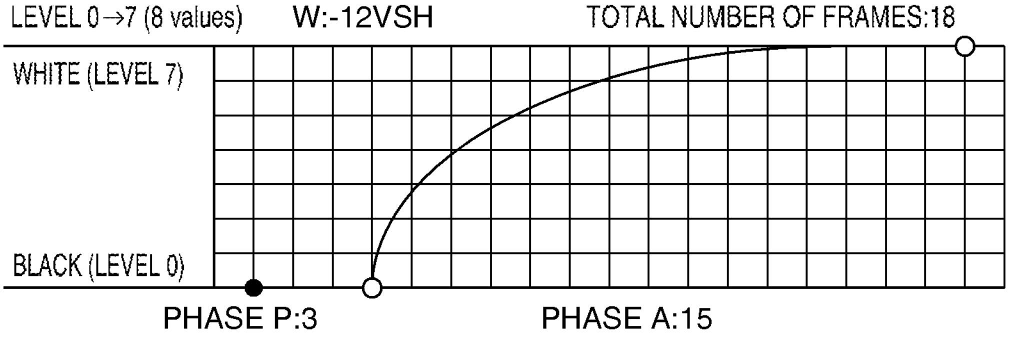
FIG. 18
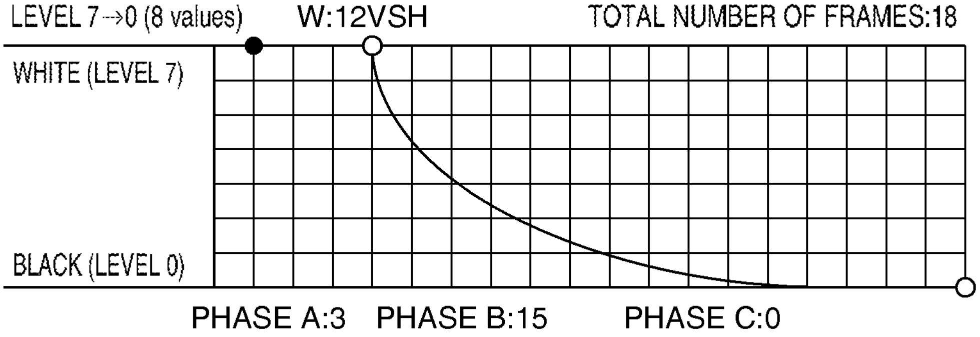
FIG. 19

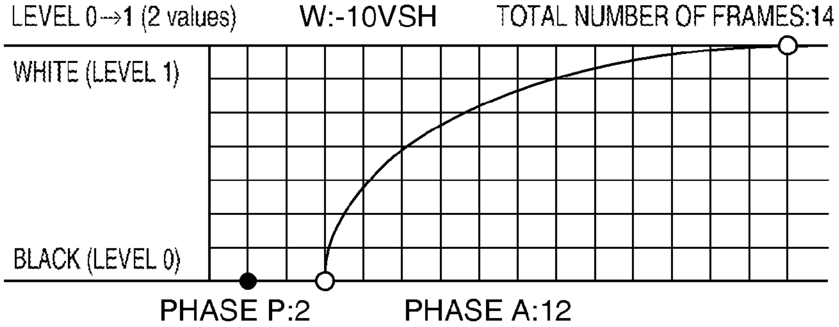
FIG. 20
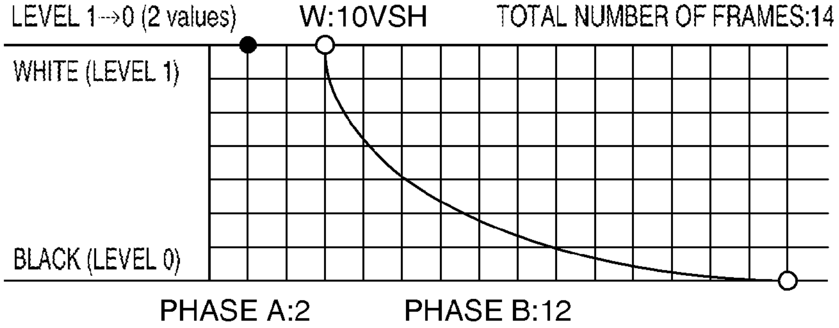
FIG. 21
| | | Gray level value | | | | | | | | | | | | | | | |
|---|---|---|---|---|---|---|---|---|---|---|---|---|---|---|---|---|---|
| Driving scheme | | 0 | 1 | 2 | 3 | 4 | 5 | 6 | 7 | 8 | 9 | 10 | 11 | 12 | 13 | 14 | 15 |
| α | 16 gray levels | 0 | 1 | 2 | 3 | 4 | 5 | 6 | 7 | 8 | 9 | 10 | 11 | 12 | 13 | 14 | 15 |
| β | 8 gray levels | 0 | | 1 | | 2 | | 3 | | | 4 | | 5 | | 6 | | 7 |
| γ2 | 4 gray levels | 0 | | | | | 1 | | | | | 2 | | | | | 3 |
| δ | 2 gray levels | 0 | | | | | | | | | | | | | | | 1 |
FIG. 22
| | | Gray level value | | | | | | | | | | | | | | | |
|---|---|---|---|---|---|---|---|---|---|---|---|---|---|---|---|---|---|
| Driving scheme | | 0 | 1 | 2 | 3 | 4 | 5 | 6 | 7 | 8 | 9 | 10 | 11 | 12 | 13 | 14 | 15 |
| α | 16 gray levels | 0 | 1 | 2 | 3 | 4 | 5 | 6 | 7 | 8 | 9 | 10 | 11 | 12 | 13 | 14 | 15 |
| β2 | 8 gray levels | 0 | | 1 | | | 2 | | 3 | 4 | | 5 | | | 6 | | 7 |
| γ2 | 4 gray levels | 0 | | | | | 1 | | | | | 2 | | | | | 3 |
| δ | 2 gray levels | 0 | | | | | | | | | | | | | | | 1 |
FIG. 23

$\alpha$

| Gray level | WHT |
|---|---|
| 0 | 0 |
| 1 | 3 |
| 2 | 5 |
| 3 | 6 |
| 4 | 7 |
| 5 | 8 |
| 6 | 8 |
| 7 | 9 |
| 8 | 9 |
| 9 | 9 |
| 10 | 10 |
| 11 | 10 |
| 12 | 10 |
| 13 | 10 |
| 14 | 10 |
| 15 | 10 |

$\beta 2$

| Gray level | WHT |
|---|---|
| 0 | 0 |
| | |
| 1 | 5 |
| | |
| | |
| 2 | 8 |
| | |
| 3 | 9 |
| 4 | 9 |
| | |
| 5 | 10 |
| | |
| | |
| 6 | 10 |
| | |
| 7 | 10 |

$\gamma 2$

| Gray level | WHT |
|---|---|
| 0 | 0 |
| | |
| | |
| | |
| | |
| 1 | 8 |
| | |
| | |
| | |
| | |
| 2 | 10 |
| | |
| | |
| | |
| | |
| 3 | 10 |

$\delta$

| Gray level | WHT |
|---|---|
| 0 | 0 |
| | |
| | |
| | |
| | |
| | |
| | |
| | |
| | |
| | |
| | |
| | |
| | |
| | |
| | |
| 1 | 10 |

FIG. 24

METHOD FOR CONTROLLING ELECTRO-OPTIC DEVICE, DEVICE FOR CONTROLLING ELECTRO-OPTIC DEVICE, ELECTRO-OPTIC DEVICE, AND ELECTRONIC APPARATUS

BACKGROUND

1. Technical Field

The present invention relates to methods for controlling an electro-optic device, devices for controlling an electro-optic device, electro-optic devices, and electronic apparatuses.

2. Related Art

As one example of the electro-optic devices described above, an electrophoretic display device is known. The electrophoretic display device displays images at a display section by applying voltages between pixel electrodes and an opposing counter electrode with electrophoretic elements containing electrophoretic particles sandwiched therebetween, thereby migrating electrophoretic particles, such as, black particles and white particles. The electrophoretic elements are composed of a plurality of microcapsules each containing a plurality of electrophoretic particles, and affixed between the pixel electrodes and the counter electrode with an adhesive composed of resin or the like. Note that the counter electrode may also be called a common electrode.

With such an electrophoretic display device, for example, white color can be displayed by applying a voltage that moves white particles to the display surface side, and black color can be display by applying voltage that moves black particles to the display surface side. Also, by adjusting the period for applying the voltage for white color or black color described above, an intermediate gray level between white color and black color (in other words, gray color) can be displayed (see, for example, U.S. Published Patent Application 2005/0001812 (Patent Document 1), U.S. Published Patent Application 2005/0280626 (Patent Document 2) and WIPO Published Patent Application WO/2005/101363 Pamphlet (Patent Document 3)).

For displaying the intermediate gray level, each of the particles may only have to be moved to the middle position between white and black displays. However, such a control is difficult, and variations might occur in the gray level to be displayed because, for example, differences occur in the positions of the respective particles. In particular, when plural intermediate gray levels are to be displayed, the variations described above greatly impact on the display image.

In contrast, for example, when the gray level is changed from light gray (that is, gray color close to white) to dark gray (that is, gray color close to black), each particle may be once moved to the position for displaying the white color or the black color from the state where the light gray is displayed, and then moved to the position for displaying the dark gray. As a result, the positions of the particles for each of the pixels can be made uniform and the intermediate gray level can be suitably displayed.

However, as described above, when voltages of mutually different polarities are alternately impressed for rewriting, bias may be caused in the polarities of the voltages impressed to the pixels through the overall rewriting process. Concretely, a difference may occur between the period in which the voltage with a polarity corresponding to white is impressed and the period in which the voltage with a polarity corresponding to black is impressed.

According to the research conducted by the inventor, if such bias is caused in the polarities as described above, it has been found that troubles, such as, for example, image burn-in and deterioration of the display section may occur. However, the technical documents of related art described above do not refer to the bias in polarities at all. In other words, the related art including the technical documents described above has a problem in that generation of bias in the polarities to be impressed to pixels cannot be prevented. Further, this problem becomes prominent when the number of displayable gray levels in the electrophoretic device is changed.

SUMMARY OF THE INVENTION

The invention has been made to solve at least a portion of the problems described above, and can be realized as embodiments or application examples to be described below.

Application Example 1

A method for controlling an electro-optic device having a display section including a plurality of pixels provided at positions corresponding to intersections between mutually intersecting plural scanning lines and plural data lines, each of the pixels including electro-optic material placed between mutually opposing pixel electrode and counter electrode, and capable of assuming a first limit optical state, a second limit optical state and a plurality of intermediate optical states between the first limit optical state and the second limit optical state, and a drive part that supplies, for displaying an image corresponding to image data at the display section, voltage pulses according to the image data to the pixel electrode of each of the pixels in a plurality of frame periods. The method includes switching between a first driving scheme for changing an optical state between a-number of optical states among an optical state group composed of the first limit optical state, the second limit optical state and the plurality of intermediate optical states and a second driving scheme for changing an optical state between b-number of optical states (b>a) among the optical state group. In the first driving scheme, an integrated value W (A→B) of drive voltage and drive time when changing the pixel from an optical state A included in the a-number of optical states to an optical state B, and an integrated value W (B→A) of drive voltage and drive time when changing the pixel from the optical state B to the optical state A satisfy a relation of W (A→B)=−W (B→A), and the integrated value W (A→B) and the integrated value W (B→A) for the optical state A and the optical state B in the second driving scheme are equal to the integrated value W (A→B) and the integrated value W (B→A) in the first driving scheme, respectively.

According to the composition described above, occurrence of bias in the polarities of the voltages impressed to the pixels rewritten can be prevented when the relation of W (A→B) =−W (B→A) described above is satisfied. Also, as the integrated values W in the first driving scheme and the second driving scheme are made equal to each other, generation of bias in the polarities of the voltages before and after the change of the driving scheme can be prevented. Accordingly, collapsing of the DC balance in the pixels can be suppressed, and troubles such as image burn-in, deterioration of the display section and the like can be effectively prevented.

Note here that the “limit optical state” is an optical state achieved by impressing a predetermined voltage sufficiently to the electro-optic material in the display section. However, the “limit optical state” in the invention not only means a state in which the optical state does not change at all even if the predetermined voltage is impressed further from that optical state, but also includes a wider concept including, for example, an optical state in which plural pixels concurrently assume the limit optical state whereby the optical state of each of the pixels is made uniform to the extent that differences in the optical state among the pixels can be reduced. Concretely, for example, when the electro-optic material is composed as an electrophoretic element including white particles and black particles, an optical state in which white color is displayed by the white particles being sufficiently drawn to the display surface side, or an optical state in which black color is displayed by the black particles being sufficiently drawn to the display surface side corresponds to the “limit optical state”.

Also, the “intermediate optical state” means an optical state in between the first limit optical state and the second limit optical state, and corresponds, for example, to an optical state in which a gray color is displayed, when the optical state of displaying the white color or the black color is assumed to be the limit optical state as described above.

Application Example 2

In the method for controlling an electro-optic device described above, the a-number of optical states in the first driving scheme may preferably be selected to be equal to corresponding ones of the b-number of optical states in the second driving scheme. According to this composition, problems such as shifts in the gray level which may occur when the driving scheme is changed among plural driving schemes can be prevented.

Application Example 3

In the method for controlling an electro-optic device described above, the first driving scheme, the second driving scheme and a third driving scheme for changing the optical state between c-number of optical states (c>b) among the optical state group may be switched for controlling, and the a-number of optical states in the first driving scheme may preferably be selected to be equal to corresponding ones of the c-number of optical states in the third driving scheme. According to this composition, problems such as deviations in the gray level which may occur when the driving scheme is changed among plural driving schemes can be prevented.

Application Example 4

In the method for controlling an electro-optic device described above, the integrated value W (A→B) and the integrated value W (B→A) for the optical state A and the optical state B in the third driving scheme may preferably be equal to the integrated value W (A→B) and the integrated value W (B→A) in the first driving scheme, respectively. According to this composition, collapsing of the DC balance which may occur when changing the driving scheme among plural driving schemes can be prevented.

Application Example 5

In the method for controlling an electro-optic device described above, an integrated value W (Li→Lj) of drive voltage and drive time for arbitrary optical states Li and Lj may be set using a weight table having one weight value for each reference optical state, and the integrated value W (Li→Lj) may preferably be decided to be proportional to the value of WHT (Lj)−WHT (Li) where WHT (Li) is the weight value of an optical state Li and WHT (Lj) is the weight value of an optical state Lj in the weight table. According to this composition, the weight value corresponding to each of the optical states can be set to an appropriate value, and the relation of W (A→B)=−W (B→A) can be reliably realized.

Application Example 6

In the method for controlling an electro-optic device described above, the weight table may preferably be provided for each of the driving schemes, and the weight values corresponding to the same optical states may preferably be equal to each other in the weight tables of the driving schemes, respectively. According to this composition, collapsing of the DC balance which may occur when changing the driving scheme among plural driving schemes can be prevented.

Application Example 7

A control device for controlling an electro-optic device in accordance with an embodiment of the invention includes a display section including a plurality of pixels provided at positions corresponding to intersections between mutually intersecting plural scanning lines and plural data lines, each of the pixels including electro-optic material placed between mutually opposing pixel electrode and counter electrode, and capable of assuming a first limit optical state, a second limit optical state and a plurality of intermediate optical states between the first limit optical state and the second limit optical state, and a drive part that supplies, for displaying an image corresponding to image data at the display section, voltage pulses according to the image data to the pixel electrode of each of the pixels in a plurality of frame periods. The control device includes a control part for controlling the electro-optic device by switching between a first driving scheme for changing an optical state between a-number of optical states among an optical state group composed of the first limit optical state, the second limit optical state and the plurality of intermediate optical states and a second driving scheme for changing an optical state between b-number of optical states (b>a) among the optical state group. In the first driving scheme, an integrated value W (A→B) of drive voltage and drive time when changing the pixel from an optical state A included in the a-number of optical states to an optical state B, and an integrated value W (B→A) of drive voltage and drive time when changing the pixel from the optical state B to the optical state A satisfy a relation of W (A→B)=−W (B→A), and the integrated value W (A→B) and the integrated value W (B→A) for the optical state A and the optical state B in the second driving scheme are equal to the integrated value W (A→B) and the integrated value W (B→A) in the first driving scheme, respectively.

According to the composition described above, occurrence of bias in the polarities of voltages impressed to the pixels to be rewritten can be prevented when the relation of W (A→B) =−W (B→A) described above is satisfied. Also, as the integrated values W are made equal to each other in the first driving scheme and the second driving scheme, occurrence of bias in the polarities of the voltages before and after the change of the driving scheme can be prevented. Accordingly, collapsing of the DC balance at the pixels can be suppressed, and troubles such as image burn-in, deterioration of the display section and the like can be effectively prevented.

Application Example 8

In the device for controlling an electro-optic device described above, the a-number of optical states in the first driving scheme may preferably be selected to be equal to corresponding ones of the b-number of optical states in the second driving scheme. According to this composition, problems such as deviations in the gray level which may occur when the driving scheme is changed among plural driving schemes can be prevented.

Application Example 9

In the device for controlling an electro-optic device described above, the first driving scheme, the second driving scheme and a third driving scheme for changing the optical state among c-number of optical states (c>b) in the optical state group may be switched for controlling, and the a-number of optical states in the first driving scheme may preferably be selected to be equal to corresponding ones of the c-number of optical states in the third driving scheme. According to this composition, problems such as deviations in the gray level which may occur when the driving scheme is changed among plural driving schemes can be prevented.

Application Example 10

In the device for controlling an electro-optic device described above, the integrated value W (A→B) and the integrated value W (B→A) for the optical state A and the optical state B in the third driving scheme may preferably be equal to the integrated value W (A→B) and the integrated value W (B→A) in the first driving scheme, respectively. According to this composition, collapsing of the DC balance which may occur when changing the driving scheme among plural driving schemes can be prevented.

Application Example 11

An electro-optic device in accordance with an embodiment of the invention is equipped with a control device for controlling the electro-optic device. According to this composition, collapsing of the DC balance in the pixels in the electro-optical device can be suppressed, and troubles such as image burn-in, deterioration of the display section and the like can be effectively prevented.

Application Example 12

An electronic apparatus in accordance with an embodiment of the invention is equipped with the electro-optical device described above. According to this composition, collapsing of the DC balance in the pixels in the electronic apparatus can be suppressed, and troubles such as image burn-in, deterioration of the display section and the like can be effectively prevented.

BRIEF DESCRIPTION OF THE DRAWINGS

FIG. 9 is a table showing a weight table to be used for deciding an integrated value W.

FIG. 10 is a table showing the relation between selectable gray levels in four driving schemes capable of displaying mutually different numbers of gray levels and the gray levels displayed at the gray levels.

FIG. 11 shows four weight tables to be used to decide integrated values W in driving schemes α-δ.

FIG. 12 is an illustration showing a concept of a voltage application method when a gray level 0 (black display) is rewritten to a gray level 1 (white display) in the two-value driving scheme δ.

FIG. 13 is an illustration showing a concept of a voltage application method when the gray level 1 (white display) is rewritten to the gray level 0 (black display) in the two-value driving scheme δ.

FIG. 14 is an illustration showing a concept of a voltage application method when the gray level 0 (black display) is rewritten to a gray level 7 (white display) in the 8-value driving scheme β.

FIG. 15 is an illustration showing a concept of a voltage application method when the gray level 7 (white display) is rewritten to the gray level 0 (black display) in the 8-value driving scheme β.

FIG. 16 shows a weight table of the 8-value driving scheme in accordance with a comparison example 1.

FIG. 17 shows a weight table of the 2-value driving scheme in accordance with the comparison example 1.

FIG. 18 is an illustration showing a concept of a voltage application method by the 8-value driving scheme, in accordance with the comparison example 1.

FIG. 19 is an illustration showing a concept of a voltage application method by the 8-value driving scheme, in accordance with the comparison example 1.

FIG. 20 is an illustration showing a concept of a voltage application method by the 2-value driving scheme, in accordance with the comparison example 1.

FIG. 21 is an illustration showing a concept of a voltage application method by the 2-value driving scheme, in accordance with the comparison example 1.

FIG. 22 is a table showing the relation between selectable gray levels in four driving schemes capable of displaying mutually different numbers of gray levels and the gray levels displayed at the gray levels.

FIG. 23 is a table showing the relation between selectable gray levels in four driving schemes capable of displaying mutually different numbers of gray levels and the gray levels displayed at the gray levels, in accordance with a modified example 1.

FIG. 24 shows weight tables to be used to decide integrated values W in accordance with the modified example 1.

DESCRIPTION OF EXEMPLARY EMBODIMENTS

An electro-optic device in accordance with the present embodiment will be described with reference to FIGS. 1 through 15. In the embodiment described below, an active matrix driving type electrophoretic display device will be enumerated as one example of the electro-optic device in accordance with the invention.

Electro-Optic Device

First, an overall configuration of the electrophoretic display device in accordance with the present embodiment will be described, with reference to FIGS. 1 to 3.

Figure 1:
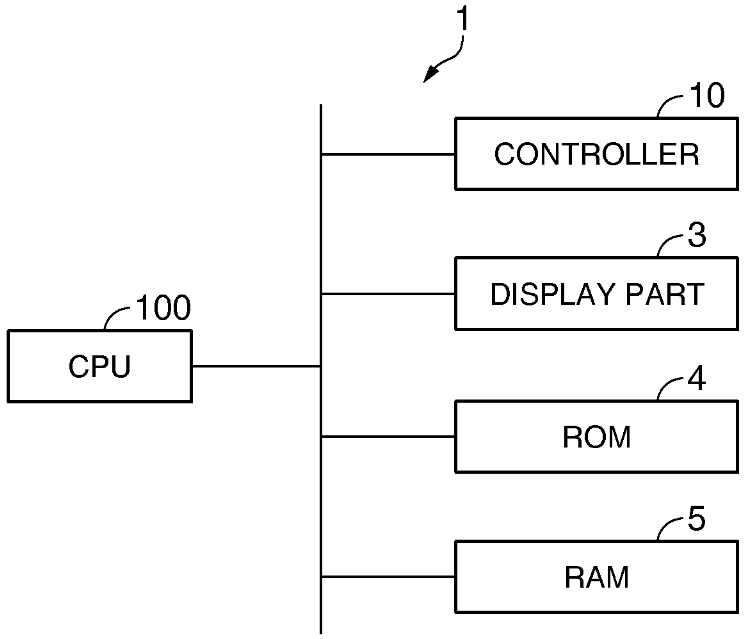
FIG. 1 is a block diagram showing an overall configuration of an electrophoretic display device in accordance with an embodiment of the invention.

FIG. 1 is a block diagram showing an overall configuration of the electrophoretic display device in accordance with the present embodiment. The electrophoretic display device 1 in accordance with the present embodiment shown in FIG. 1 is equipped with a display section 3, a ROM (Read Only Memory) 4, a RAM (Random Access Memory) 5, a controller 10, and a CPU (Central Processing Unit) 100.

The display section 3 is a display device that has a display element having memory property, which maintains a display state even in a state in which writing is not conducted. Note that the memory property is a property that, when entering a predetermined display state by application of voltage, would maintain the display state, even when the voltage application is removed.

The ROM 4 is a device that stores data to be used when the electrophoretic display device 1 is operated. For example, the ROM 4 stores a waveform table of drive voltages to achieve a display state targeted at each of the pixels. The waveform table of drive voltages will be described in detail later. Note that the ROM 4 can be substituted by a rewritable storage device such as a RAM.

The RAM 5 is a device that stores data used when the electrophoretic display device 1 is operated, similarly to the ROM 4 described above. The RAM 5 stores, for example, data indicative of a display state before a rewriting operation and data indicative of a display state after the rewriting operation, changes. Also, the RAM 5 includes a VRAM (Video RAM), etc. that function, for example, as a frame buffer, and stores frame image data based on the control of the CPU 100.

The controller 10 controls the display operation of the display section 3 by using the data stored in the ROM 4 and the RAM 5 described above. The controller 10 controls the display section 3 by outputting an image signal indicative of an image to be displayed in the display section 3 and various other signals (for example, a clock signal, etc.)

The CPU 100 is a processor that controls the operation of the electrophoretic display device 1, and reads and writes data by executing programs stored in advance. The CPU 100 renders the VRAM to store image data to be displayed in the display section 3 when the image is rewritten.

Figure 2:
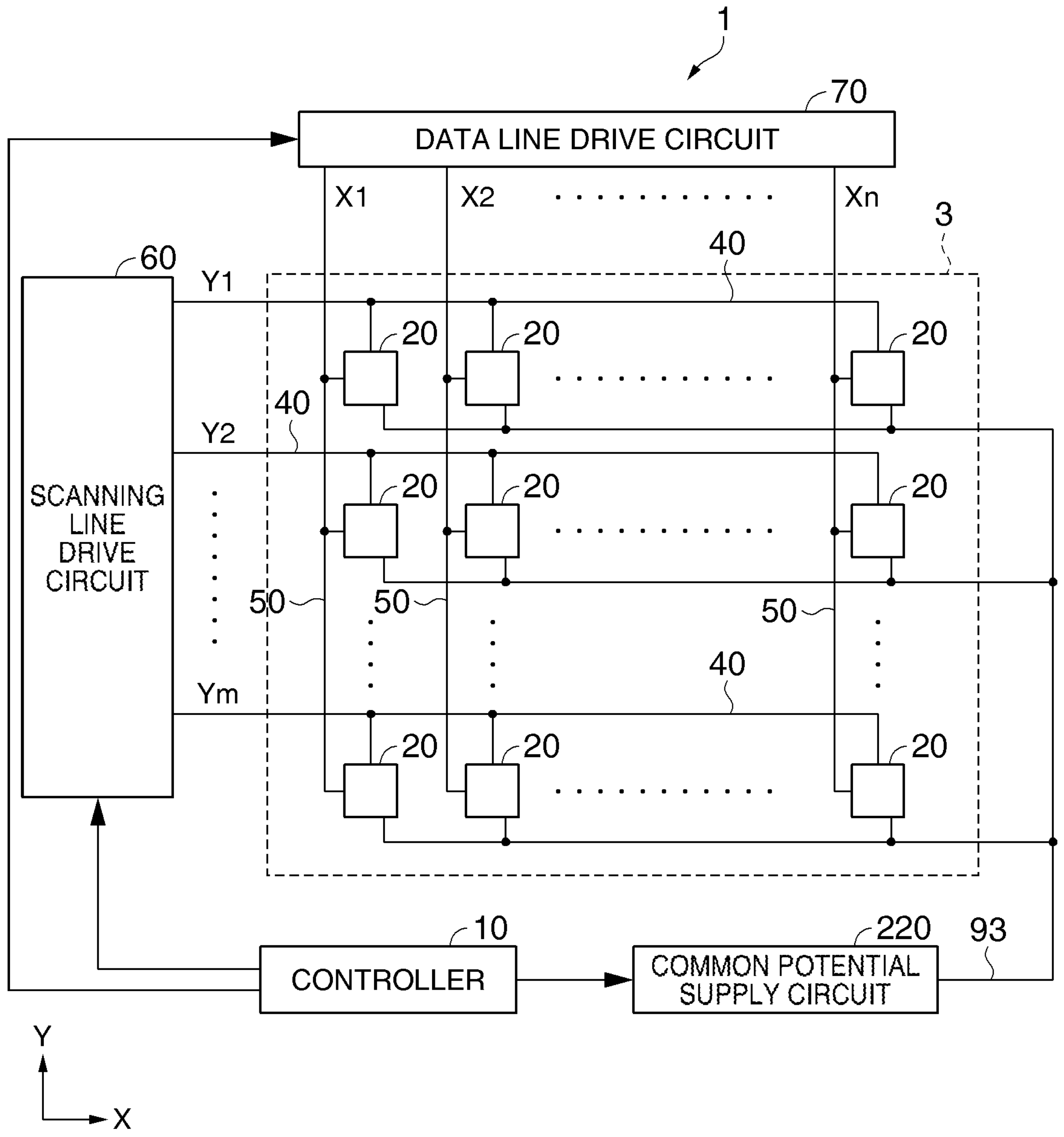
FIG. 2 is a block diagram showing a configuration around a display section of the electrophoretic display device in accordance with the embodiment.

FIG. 2 is a block diagram showing a configuration of a peripheral section of the display section of the electrophoretic display device in accordance with the embodiment.

In FIG. 2, the electrophoretic display device 1 in accordance with the present embodiment is an electrophoretic display device of an active matrix drive type, and has a display section 3, a controller 10, a scanning line drive circuit 60, a data line drive circuit 70, and a common potential supply circuit 220.

In the display section 3, m rows×n columns of pixels 20 are arranged in a matrix (in a two-dimensional plane). Also, on the display section 3, m scanning lines 40 (that is, scanning lines Y1, Y2, . . . and Ym), and n data lines 50 (that is, data lines X1, X2, . . . and Xn) are arranged in a manner to intersect one another. Concretely, the m scanning lines 40 extend in a row direction (i.e., X direction), and the n data lines 50 extend in a column direction (i.e., Y direction). Pixels 20 are disposed at positions corresponding to intersections between the m scanning lines 40 and the n data lines 50.

The controller 10 controls the operation of the scanning line drive circuit 60, the data line drive circuit 70, and the common potential supply circuit 220. The controller 10 supplies timing signals, such as, for example, a clock signal, a start pulse, etc., to each of the circuits.

The scanning line drive circuit 60 sequentially supplies a scanning signal in pulses to each of the scanning lines Y1, Y2, . . . , Ym during a predetermined frame period under the control of the controller 10.

The data line drive circuit 70 supplies data potentials to the data lines X1, X2, . . . , and Xn under the control of the controller 10. The data potential assumes a standard potential GND (for example, 0 volt), a high potential VSH (for example, +15 volt) or a low potential −VSH (for example, −15 volt).

The common potential supply circuit 220 supplies a common potential Vcom (in the embodiment, the same potential as the reference potential GND) to the common potential line 93. Note that the common potential Vcom may be a potential different from the reference potential GND within the range where a voltage is not substantially generated between the counter electrode 22 to which the common potential Vcom is supplied and the pixel electrode 21 to which the reference potential GND is supplied. For example, the common potential Vcom may assume a value different from the reference potential GND supplied to the pixel electrode 21, in consideration of changes in the potential of the pixel electrode 21 due to feedthrough, and even in this case, the common potential Vcom and the reference potential GND are considered to be the same in the present specification.

After the scanning signal is supplied to the scanning lines 40, and potentials are supplied to the pixel electrodes 21 through the data lines 50, and then when the supply of the scanning signal to the scanning lines 40 ends (for example, when the potential on the scanning lines 40 decreases), the potential on the pixel electrodes 21 may fluctuate (for example, decrease with the lowering potential on the scanning lines 40) due to the parasitic capacitance between the scanning lines 40. This phenomenon is called feedthrough. Assuming in advance that the potential on the pixel electrode 21 would lower due to feedthrough, the common potential Vcom may be set to a value slightly lower than the reference potential GND to be supplied to the pixel electrode 21. Even in this case, the common potential Vcom and the reference potential GND are considered to be the same potential.

Though various signals are input to and output from the controller 10, the scanning line drive circuit 60, the data line drive circuit 70, and the common potential supply circuit 220, the explanation for signals irrelevant to the present embodiment is omitted.

Figure 3:
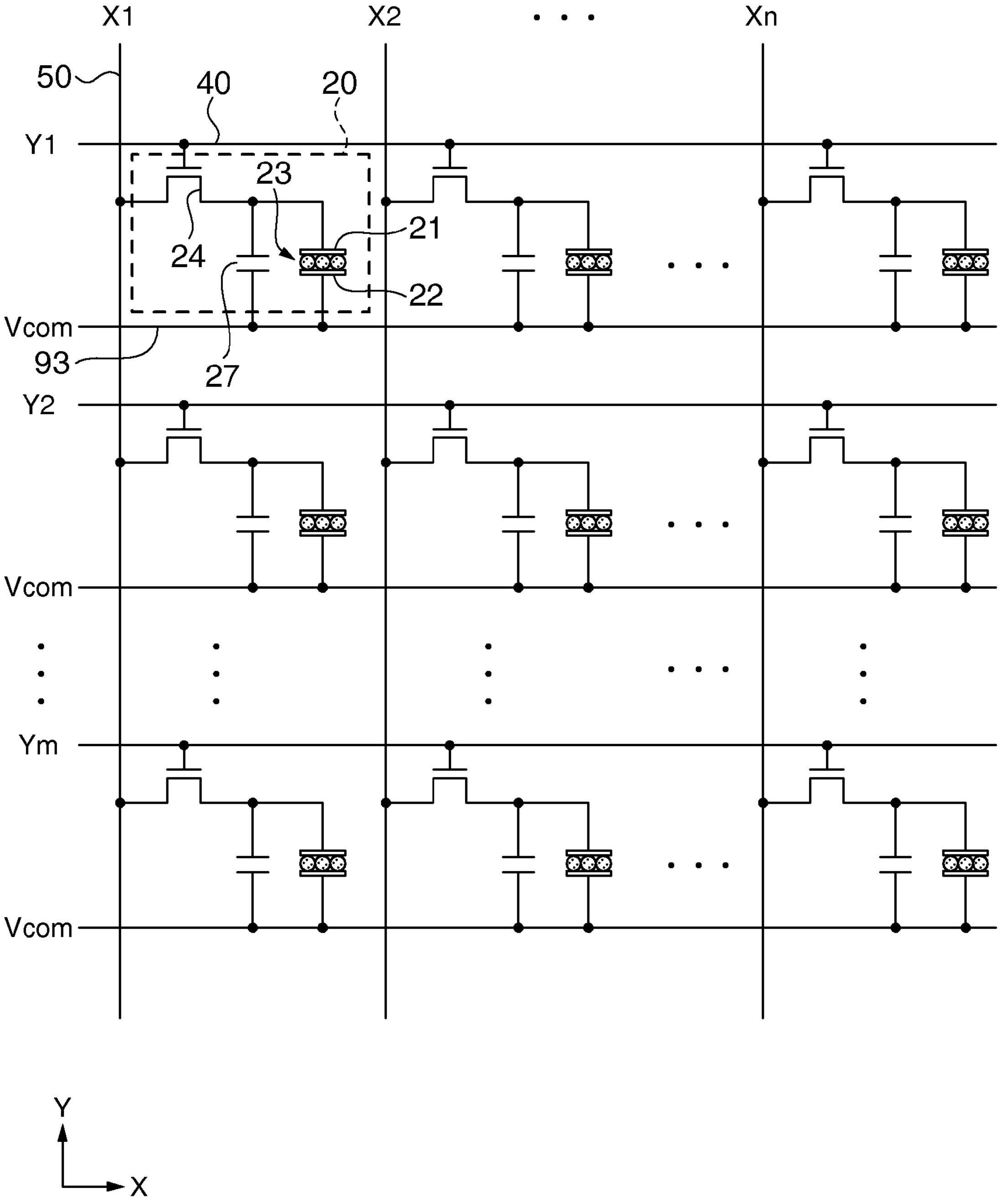
FIG. 3 is an equivalent circuit diagram showing an electrical configuration of pixels in accordance with an embodiment.

FIG. 3 is an equivalent circuit diagram of the electrical configuration of pixels 20 in accordance with the present embodiment. As shown in FIG. 3, each of the pixels 20 is equipped with a pixel switching transistor 24, a pixel electrode 21, a counter electrode 22, an electrophoretic element 23, and a retention capacitance 27.

The pixel switching transistor 24 is formed from, for example, an N type transistor. The pixel switching transistor 24 has a gate electrically connected with the scanning line 40, a source electrically connected with the data line 50, and a drain electrically connected with the pixel electrode 21 and the retention capacitance 27. The pixel switching transistor 24 outputs data potential supplied from the data line drive circuit 70 (see FIG. 2) through the data line 50 to the pixel electrode 21 and the retention capacitor 27 with a timing corresponding to the scanning signal in pulses supplied through the scanning line 40 from the scanning line drive circuit 60 (see FIG. 2).

The data potential is supplied to the pixel electrode 21 from the data line drive circuit 70 through the data line 50 and the pixel switching transistor 24. The pixel electrode 21 is arranged in a manner facing the counter electrode 22 through the electrophoretic element 23.

The counter electrode 22 is electrically connected to the common potential line 93 to which the common potential Vcom is supplied.

The electrophoretic element 23 is formed from a plurality of microcapsules each containing electrophoretic particles.

The retention capacitance 27 is formed from a pair of electrodes arranged opposite each other through a dielectric film. One of the electrodes is electrically connected with the pixel electrode 21 and the pixel switching transistor 24, and the other electrode is electrically connected with the common potential line 93. The data potential can be retained only for a certain period by the retention capacitance 27.

Next, a concrete configuration of the display section of the electrophoretic display device in accordance with the present embodiment will be described referring to FIG. 4.

Figure 4:
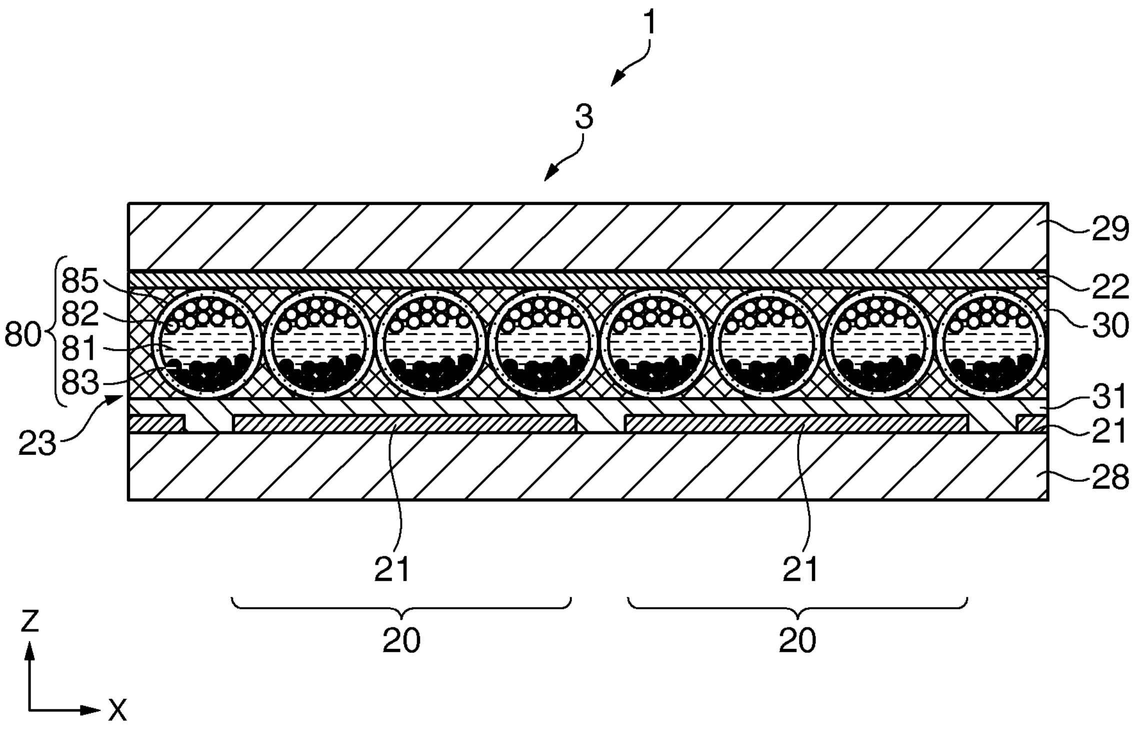
FIG. 4 is a cross-sectional view in part of the display section of the electrophoretic display device in accordance with the embodiment.

FIG. 4 is a cross-sectional view in part of the display section 3 of the electrophoretic display device 1 in accordance with the present embodiment.

In FIG. 4, the display section 3 is configured such that the electrophoretic element 23 is held between the element substrate 28 and the counter substrate 29. The embodiment is described assuming that an image is displayed on the side of the counter substrate 29.

The element substrate 28 is made of glass or plastic material, for example. A laminated structure in which the pixel switching transistor 24, the retention capacitance 27, the scanning lines 40, the data lines 50 and the common potential line 93 described above with reference to FIG. 2, though their illustration is omitted here, are formed on the element substrate 28. The plural pixel electrodes 21 are arranged on the upper layer side of the laminated structure in a matrix configuration as viewed in a plan view.

The counter substrate 29 is a transparent substrate made of, for example, glass, plastics or the like. On an opposing surface of the counter substrate 29 facing the element substrate 28, a counter electrode 22 is formed solidly, opposite the plural pixel electrodes 21. The counter electrode 22 is made of a transparent conductive material, such as, for example, magnesium silver (MgAg), indium tin oxide (ITO), indium zinc oxide (IZO), or the like.

The electrophoretic element 23 is made up of a plurality of microcapsules 80 each containing electrophoretic particles, and is fixed between the element substrate 28 and the counter substrate 29 by means of a binder 30 made of a resin or the like and an adhesive layer 31. Note that the electrophoretic display device 1 in accordance with the present embodiment is manufactured by a manufacturing process in which an electrophoretic sheet is bonded to the element substrate 28 having the pixel electrodes 21, etc. formed thereon through the adhesive layer 31. The electrophoretic sheet is a sheet having the counter substrate 29 and the electrophoretic element 23 affixed to the counter substrate 29 on the side of the element substrate 28 with the binder 30.

One or a plurality of microcapsules 80 are disposed in each of the pixels 20 (in other words, for each of the pixel electrodes 21) and sandwiched between the pixel electrode 21 and the counter electrode 22. The microcapsule 80 includes a dispersion medium 81, a plurality of white particles 82 and a plurality of black particles 83 contained in a membrane 85. The microcapsule 80 is formed in a spherical body having a grain diameter of, for example, about 50 μm.

The membrane 85 functions as an outer shell of the microcapsule 80, and may be formed from acrylic resin such as polymethyl methacrylate and polyethyl methacrylate, or polymer resin having translucency such as urea resin, gum Arabic and gelatin.

The dispersion medium 81 is a solvent in which the white particles 82 and black particles 83 are dispersed in the microcapsule 80 (in other words, within the membrane 85). As the dispersion medium 81, water; alcohol solvents (such as, methanol, ethanol, isopropanol, butanol, octanol, and methyl cellosolve); esters (such as, ethyl acetate, and butyl acetate); ketones (such as, acetone, methyl ethyl ketone, and methyl isobutyl ketone); aliphatic hydrocarbons (such as, pentane, hexane, and octane); alicyclic hydrocarbons (such as, cyclohexane and methylcyclohexane); aromatic hydrocarbons (such as, benzene, toluene, benzenes having a long-chain alkyl group (such as, xylene, hexylbenzene, butylbenzene, octylbenzene, nonylbenzene, decylbenzene, undecylbenzene, dodecylbenzene, tridecylbenzene, and tetradecylbenzene)); halogenated hydrocarbons (such as, methylene chloride, chloroform, carbon tetrachloride, and 1,2-dichloroethane); carboxylates, and any one of other various oils may be used alone or in combination, and may be further mixed with a surfactant.

The white particles 82 are particles (polymer or colloid) made of white pigment, such as, for example, titanium dioxide, flowers of zinc (zinc oxide), antimony oxide, or the like, and may be negatively charged, for example.

The black particles 83 are particles (polymer or colloid) made of black pigment, such as, for example, aniline black, carbon black or the like, and may be positively charged, for example.

Accordingly, the white particles 82 and the black particles 83 can move in the dispersion medium 81 by an electric field generated by a potential difference between the pixel electrode 21 and the counter electrode 22.

A charge-controlling agent made of particles, such as, electrolytes, surfactant, metal soap, resin, rubber, oil, varnish or compound, a dispersing agent, such as, a titanium coupling agent, an aluminum coupling agent, a silane coupling agent, or the like, lubricant, stabilizing agent, and the like may be added to the aforementioned pigment as necessary.

As shown in FIG. 4, when a voltage is applied between the pixel electrode 21 and the counter electrode 22 to set the potential on the counter electrode 22 to be relatively higher than the other, the positively charged black particles 83 are drawn to the side of the pixel electrode 21 within the microcapsules 80 by a Coulomb force, and the negatively charged white particles 82 are drawn to the side of the counter electrode 22 within the microcapsules 80 by a Coulomb force.

As a result, the white particles 82 gather on the side of the display surface (in other words, on the side of the counter electrode 22) within the microcapsules 80, whereby the color of the white particles 82 (i.e., white) is displayed at the display surface of the left screen 110.

On the other hand, when a voltage is applied between the pixel electrode 21 and the counter electrode 22 to set the potential on the pixel electrode 21 to be relatively higher than the other, the negatively charged white particles 82 are drawn to the side of the pixel electrode 21 within the microcapsules 80 by a Coulomb force, and the positively charged black particles 83 are drawn to the side of the counter electrode 22 within the microcapsules 80 by a Coulomb force.

As a result, the black particles 83 gather on the side of the display surface within the microcapsules 80, whereby the color of the black particles (i.e., black) is displayed at the display surface of the left screen 110.

Also, by placing the white particles 82 and the black particles 83 in a middle position between the display surface side and the rear surface side of the display section 3, the state of displaying an intermediate gray level (an intermediate optical state) can be achieved. More specifically, by placing the white particles 82 at an intermediate position relatively close to the display surface side (or placing the black particles 83 at an intermediate position relatively far from the display surface side), light gray can be displayed. Alternatively, by placing the white particles 82 at an intermediate position relatively far from the display surface side (or placing the black particles 83 at an intermediate position relatively close to the display surface side), dark gray can be displayed. Note that the pigment used for the white particles 82 or the black particles 83 may be replaced with other pigment of different color, such as, red, green, blue or the like, whereby red color, green color, blue color or the like can be displayed.

Next, referring to FIG. 5 and FIG. 6, the characteristic of the display section 3 of the electrophoretic display device 1 in accordance with the present embodiment will be described. In the following section, an example in which the electrophoretic display device 1 in accordance with the present embodiment is capable of displaying gray levels in eight stages from level 0 to level 7 will be described. In this example, it is assumed that the gray level corresponding to black is level 0, the gray level corresponding to white is level 7, and intermediate gray levels corresponding to level 1 through level 6 are intermediate gray levels between black and white, respectively. The "gray level" referred here is one example of an "optical state" in the invention, and may be paraphrased as, for example, brightness or reflectivity. Also, magnitudes of gray level that are numerically converted may also be called below as gray level values.

Figure 5:
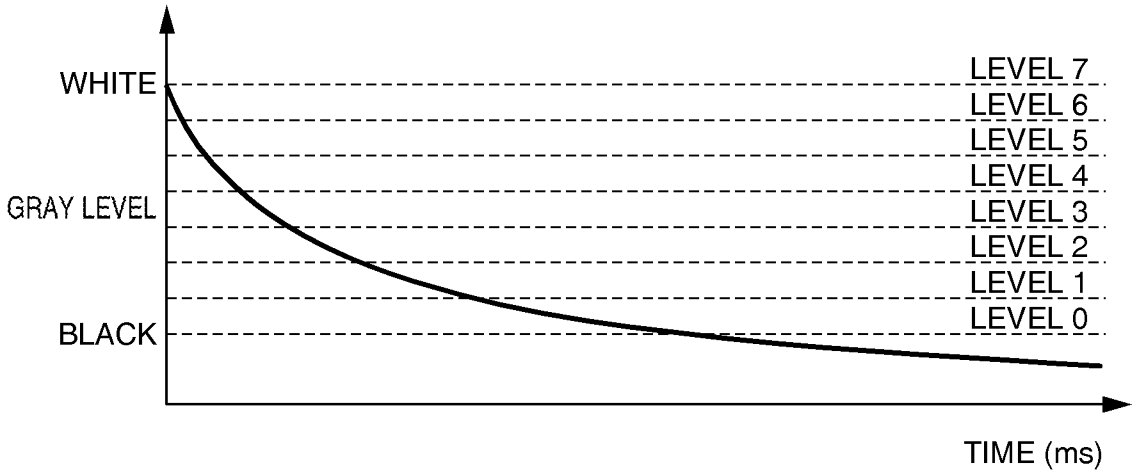
FIG. 5 is a graph showing changes in the gray level when rewriting from white color to black color.

FIG. 5 is a graph showing changes in the gray level when the display at the display section 3 is rewritten from white to black. In FIG. 5, when an image is rewritten from white to black, the change in the gray level with respect to the period in which the voltage is impressed tends to become smaller as it approaches an opposite gray level, though it is large immediately after the beginning of rewriting. In other words, the gray level greatly changes toward black when it is close to white, but the gray level becomes more difficult to change as it approaches black.

Figure 6:
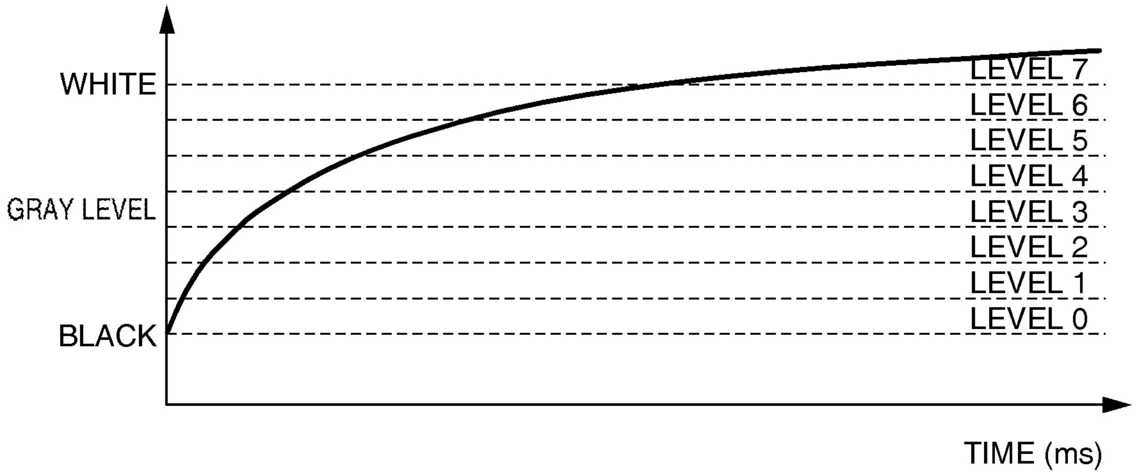
FIG. 6 is a graph showing changes in the gray level when rewriting from black color to white color.

FIG. 6 is a graph showing changes in the gray level when the display at the display section 3 is rewritten from black to white. In FIG. 6, when an image is rewritten from black to white, similarly, the change in the gray level with respect to the period in which the voltage is impressed tends to become smaller as it approaches an opposite gray level, though it is large immediately after the beginning of rewriting. In other words, the gray level greatly changes toward white when it is close to black, but the gray level becomes more difficult to change as it approaches white.

In this manner, the display section 3 has a nonlinear characteristic in which the gray level change rate to the period of impressing the drive voltage changes. Therefore, even if the drive voltage is simply impressed only for the period corresponding to the change rate of the gray level, it is difficult to achieve the desired gray level. Therefore, in the present embodiment, the target gray level is achieved by a plurality of phases of impressing voltages of different polarities.

Driving Waveform

Figure 7:
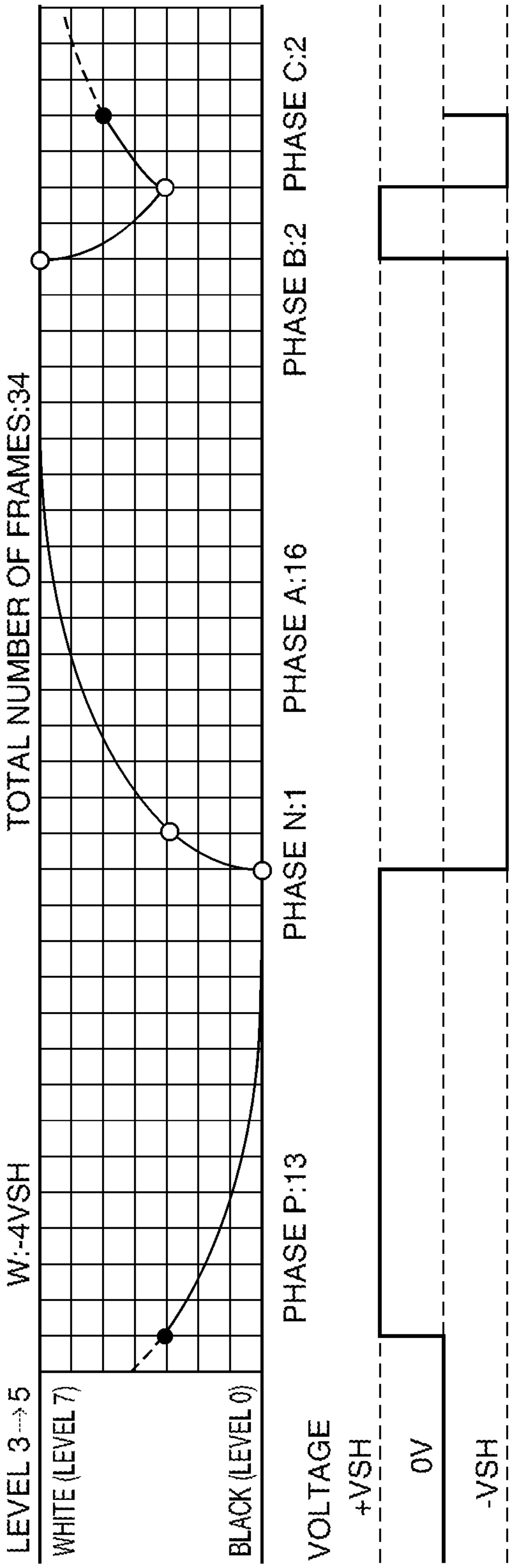
FIG. 7 is an illustration showing a concept of a voltage application method when an intermediate gray level 3 is rewritten to an intermediate gray level 5.

In the following section, driving waveforms to be used for an image rewriting operation of the electrophoretic display device 1 will be described with reference to FIGS. 7-9. FIG. 7 is an illustration showing a concept of a voltage application method when an intermediate gray level 3 is rewritten to an intermediate gray level 5 which is performed by the electrophoretic display device 1 that is capable of displaying eight gray level values including white and black. According to the voltage application method of FIG. 7, a predetermined voltage is applied to the pixel 20 to be rewritten in each of Phase P, Phase N, Phase A, Phase B, and Phase C. Phases P, N, A, B, and C each include one frame period or two or more frame periods, respectively. One frame period (which may also be simply called a "frame") is a period in which the scanning lines 40 included in the display section 3 are selected once, and can also be paraphrased as a vertical scanning period.

In each frame period, the drive voltage of +VSH, 0V or −VSH with the potential on the counter electrode 22 as a reference is applied to the pixel electrode 21 of the pixel 20 to be rewritten. More specifically, +VSH is applied in Phase P and Phase B, and −VSH is applied in Phase N, Phase A, and Phase C. The drive voltage is applied to the pixel electrode 21 through the data line 50 and the pixel switching transistor 24 during the period when the scanning line 40 is selected, and it is maintained by the retention capacitance 27. A series of the drive voltages impressed in the respective frames in Phases P, N, A, B and C to rewrite the display of the pixel 20 is called a driving waveform. In the present specification, applying the drive voltage to the pixel electrode 21 may also be simply expressed as "applying the drive voltage to the pixel". Note that information of driving waveforms, that is, information indicative of drive voltages to be applied to the pixel 20 in each frame is stored, for example, in a waveform table in the ROM 4. The operation in each of the phases in FIG. 7 will be described.

First, the drive voltage +VSH corresponding to black is applied to the pixel 20 to be rewritten through thirteen frames in Phase P. As a result, the displayed gray level assumes level 0 (black). Next, the drive voltage −VSH corresponding to white is applied through one frame in Phase N. As a result, the displayed gray level assumes level 3. In other words, the displayed gray level of the pixel 20 that was at level 3 before rewriting becomes level 0 through Phase P, and further, returns to level 3 through Phase N. The reason for providing Phases P and N will be described later.

Next, the drive voltage −VSH corresponding to white is applied through 16 frames in Phase A. As a result, the displayed gray level assumes level 7 (white). Phase A is set as a period in which the drive voltage −VSH corresponding to white will be impressed long enough until the gray level displayed so far becomes white. Note that Phase A can be omitted when it is judged that white is displayed in the pixel to be rewritten.

According to Phase A, before achieving the intermediate gray level that is the target gray level, the white color is once displayed, whereby the positions of the white particles 82 and the black particles 83 which may vary among the pixels can be made uniform. Therefore, it is possible to prevent generation of deviations in the gray level to be displayed, which originates from the fact that differences are generated in the positions of the particles in each pixel 20 when the intermediate gray level is displayed.

In succession, the drive voltage +VSH corresponding to black is impressed by two frames in Phase B. As a result, the displayed gray level assumes level 3. Phase B is a period in which the drive voltage +VSH corresponding to black (that is, the potential of a reverse-polarity with respect to Phase A) is impressed to the pixel 20 to be rewritten. By setting Phase B in a relatively short period (in other words, a period to the extent that the displayed gray level does not reach black), a gray color that is an intermediate gray level between white and black can be achieved. However, there may be cases where the target gray level cannot be achieved only by Phase B, due to the nonlinear characteristic of the electrophoretic element 23 described above. In the case of FIG. 7, the displayed gray level already assumes level 4 when Phase B has passed by one frame, which already exceeds the target gray level 5 toward the black side. In other words, an intermediate gray level of level 5 or 6 cannot be displayed by Phases A and B alone.

Accordingly, the gray level is fine-tuned in the following phase C. Phase C is set as a period to bring the gray level that has become close to black more than the target gray level by voltage application in Phase B to the target gray level. In phase C, the drive voltage −VSH corresponding to white (that is, the voltage of the same polarity as that of Phase A) is impressed to the pixel 20 to be rewritten. In the case of FIG. 7, the drive voltage −VSH corresponding to white is impressed to the pixel 20 to be rewritten by two frames in Phase C. As a result, the displayed gray level assumes level 5 that is the target gray level. By using Phase C, a gray level that cannot be achieved by Phase B alone can be achieved well.

Note that voltages of different polarities are alternately impressed to the pixels 20 in Phases A, B and C, and through various frame periods. As a result, in view of Phases A, B and C considered as a whole, the balance in polarity of voltages impressed to the pixels (which may also be called the DC balance) may collapse, and bias might be generated in polarity of the voltages impressed to the pixels. For example, a difference may be generated between the period in which the voltage of a negative polarity is impressed and the period in which the voltage of a positive polarity is impressed.

According to the research conducted by the inventor, if such bias in the polarities described above is generated, it has been found that troubles, such as, for example, image burn-in and deterioration of the display section may occur. To prevent such troubles, Phase P and Phase N for maintaining the DC balance are executed before Phases A, B and C.

As described above, in Phase P, the drive voltage +VSH corresponding to black is impressed by 13 frames and, in Phase N, the drive voltage −VSH corresponding to white is impressed by one frame. Each of the periods of Phase P and Phase N is set such that an integrated value W of drive voltage to be impressed and drive time (which may simply be referred to as an “integrated value W”) when rewriting is performed assumes a predetermined value.

When an integrated value in the case of rewriting pixels from an arbitrary optical state A to an optical state B is assumed to be an integrated value W (A→B), the frame period of Phase A is AF, the frame period of Phase B is BF, the frame period of Phase C is CF, the frame period of Phase P is PF and the frame period of Phase N is NF, the integrated value W (A→B) can be obtained by Expression (1) as follows.

$$W(A \rightarrow B) = VSH \times (-AF + BF - CF + PF - NF) \quad (1)$$

In the example shown in FIG. 7, when rewriting the intermediate gray level 3 to the intermediate gray level 5, Phase P is set to 13 frames, Phase N is set to 1 frame, Phase A is set to 16 frames, Phase B is set to 2 frames, and Phase C is set to 2 frames, respectively. Accordingly, the integrated value W (3→5) in this case is obtained by Expression (2) as shown below. Note that the change in gray level (3→5) is described in the brackets at the integrated value W. In the present specification, the gray levels described in the brackets at an integrated value W are assumed to mean optical states corresponding to the gray levels.

$$W(3 \rightarrow 5) = VSH \times (-16 + 2 - 2 + 13 - 1) = -4VSH \quad (2)$$

Furthermore, the integrated value W is set such that an integrated value W (A→B) when rewriting an arbitrary optical state A to an optical state B, and an integrated value W (B→A) when rewriting the optical state B to the optical state A satisfy Expression (3) as follows.

$$W(A \rightarrow B) = -W(B \rightarrow A) \quad (3)$$

In other words, the periods of Phase P and Phase N are set such that the integrated values when rewriting in opposite directions have the same absolute values though their signs (positive and negative) are mutually different.

Figure 8:
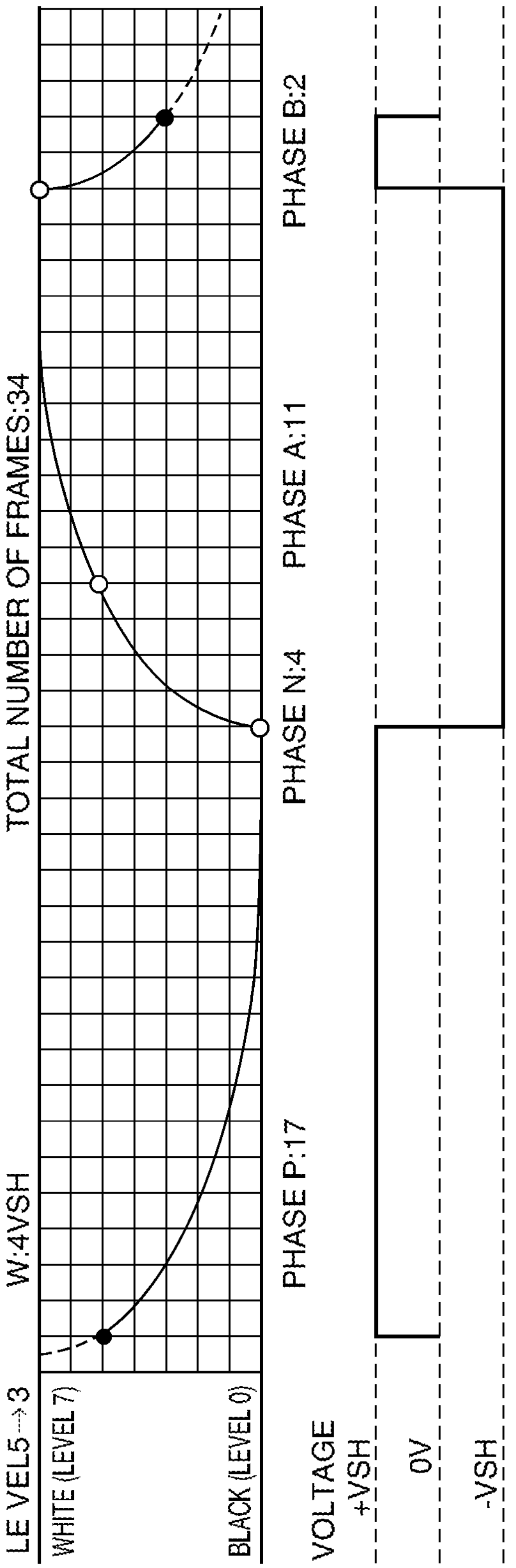
FIG. 8 is an illustration showing a concept of a voltage application method when an intermediate gray level 5 is rewritten to an intermediate gray level 3.

FIG. 8 is an illustration showing a concept of a voltage application method when an intermediate gray level 5 is rewritten to an intermediate gray level 3. As the integrated value W (3→5) is −4 VSH, an integrated value W (5→3) only needs to assume 4 VSH when rewriting in the opposite direction. To satisfy such a relation, Phase P is set to 17 frames, Phase N is set to 4 frames, Phase A is set to 11 frames, Phase B is set to 2 frames, and Phase C is set to 0 frame, respectively. Accordingly, the integrated value W (5→3) in this case is obtained by Expression (4) as follows.

$$W(5 \rightarrow 3) = VSH \times (-11 + 2 - 0 + 17 - 4) = 4VSH \quad (4)$$

In this manner, by satisfying the relation W (A→B)=−W (B→A), generation of bias in the polarities of the voltages to be applied to the pixels 20 to be rewritten can be prevented. Accordingly, collapsing of the DC can be suppressed, and troubles such as image burn-in, deterioration of the display section and the like can be effectively prevented.

It is extremely difficult to achieve the relation of W (A→B)=−W (B→A) by Phase A, Phase B and Phase C alone due to the non-linear characteristic described with reference to FIGS. 5 and 6. In contrast, in accordance with the present embodiment, Phase P and Phase N are performed before Phase A, Phase B and Phase C, such that the relation of W (A→B)=−W (B→A) can be suitably achieved by adjusting the period of each of Phase P and Phase N.

It is preferable that the gray level before the beginning of Phase P (in other words, before the beginning of rewriting) is equal to the gray level after the end of Phase N (in other words, immediately before the beginning of Phase A). For example, in the case shown in FIG. 7, both of the gray level before the beginning of Phase P and the gray level after the end of Phase N are set to be level 3. As a result, each of the periods of Phase A, Phase B and Phase C that substantially form the rewriting period can be set without depending on the period of Phase P and Phase N.

Note that all of Phases P, N, A, B and C may not always necessarily be provided. Under the condition that the relation of W (A→B)=−W (B→A) is satisfied in the rewriting operation, one or more of Phases P, N, A, B and C may be omitted.

FIG. 9 shows a weight table to be used for deciding an integrated value W. The frame period of each phase can be readily set by using the weight table. The weight table has weight values WHT corresponding respectively to the gray levels from 0 to 7. Each of the weight values WHT is a value corresponding to an integrated value of drive voltage and drive time when rewriting an image described above.

Concretely, the period of each phase is set as follows. A value is obtained by subtracting the weight value WHT corresponding to the gray level before rewriting from the weight value WHT corresponding to the target gray level, the positive/negative sign of the value is reversed to obtain a sign reversed value, and the sign reversed value is multiplied by a drive voltage VSH to obtain a product. The period of each phase is set such that the resultant product becomes an integrated value of drive voltage and drive time in actual rewriting.

For example, when the intermediate gray level 3 is rewritten to an intermediate gray level 5 as shown in FIG. 7, the integrated value W (3→5) can be obtained by Expression (5) as shown below, using the weight value WHT (5) corresponding to level 5 that is the target gray level and the weight value WHT (3) corresponding to level 3 that is a gray level before rewriting.

$$\begin{aligned} W(3 \to 5) &= -(WHT(5) - WHT(3)) \times VSH \\ &= -(10 - 6) \times VSH \\ &= -4VSH \end{aligned} \tag{5}$$

Based on this result, Phase P is set to 13 frames, Phase N is set to 1 frame, Phase A is set to 16 frames, Phase B is set to 2 frames, and Phase C is set to two frames, respectively, such that the integrated value W becomes −4 VSH.

Also, when the intermediate gray level 5 is rewritten to the intermediate gray level 3 as shown in FIG. 8, the integrated value W (5→3) can be obtained by Expression (6) as follows.

$$\begin{aligned} W(5 \to 3) &= -(WHT(3) - WHT(5)) \times VSH \\ &= -(6 - 10) \times VSH \\ &= 4VSH \end{aligned} \tag{6}$$

Based on this result, Phase P is set to 17 frames, Phase N is set to 4 frames, Phase A is set to 11 frames, Phase B is set to 2 frames, and Phase C is set to 0 frame, respectively, such that the integrated value W becomes 4 VSH.

In this manner, by using the weight table, the relation of W (A→B)=−W (B→A) can be satisfied, when an arbitrary gray level is rewritten to another arbitrary gray level. As a result, the DC balance can be regulated for a long time.

Driving Scheme

The voltage application method in FIGS. 7 and 8, and the weight table in FIG. 9 are both used when the electrophoretic display device 1 is used in an 18-gray level display mode. In the following, description will be made as to control methods when the electrophoretic display device 1 is operated in multiple display modes each capable of displaying a different number of gray levels. In each of the display modes, the electrophoretic display device 1 is controlled by a driving scheme corresponding to each of the respective display modes. The driving scheme is a concept including a set of driving waveforms used in each corresponding display mode.

FIG. 10 is a table showing gray levels that can be selected in each of the four driving schemes each capable of displaying a different number of gray levels, the relation between the gray levels and gray levels to be displayed at the gray levels (in other words, optical states that can be realized at the gray levels). In FIG. 10, for the convenient sake, the gray levels to be displayed (optical states to be realized) are expressed by 16 gray level values in total from 0 to 15. The gray level value 0 corresponds to the optical state of black display, the gray level value 15 corresponds to the optical state of white display, and the gray levels 1 to 14 correspond to optical states of displaying intermediate gray levels, respectively. The luminance distribution of the 16 gray level values may not necessarily be at equal intervals, but it is assumed that, the greater the gray level value, the greater brightness is displayed.

In FIG. 10, display modes capable of displaying 16 gray levels, 8 gray levels, 4 gray levels and 2 gray levels are provided. In each of the display modes, the electrophoretic display device 1 is controlled by one of the driving schemes α, β, γ and δ.

The driving scheme α is a driving scheme that is capable of transitioning the optical state among 16 optical states in total including a gray level 0 that performs black display (at gray level value 0), a gray level 15 that performs white display (at gray level value 15), and gray levels 1-14 that perform displaying intermediate gray levels (at gray level values 1-14) between the foregoing gray levels.

The driving scheme β is a driving scheme that is capable of transitioning the optical state among 8 optical states in total including a gray level 0 that performs black display (at gray level value 0), a gray level 7 that performs white display (at gray level value 15), and gray levels 1-6 that perform displaying intermediate gray levels (at gray level values 2, 4, 6, 9, 11 and 13).

The driving scheme γ is a driving scheme that is capable of transitioning the optical state among 4 optical states in total including a gray level 0 that performs black display (at gray level value 0), a gray level 3 that performs white display (at gray level value 15), and 2 gray levels 1 and 2 that perform displaying two intermediate gray levels (at gray level values 4 and 11).

The driving scheme δ is a driving scheme that is capable of transitioning the optical state only among 2 optical states in total including a gray level 0 that performs black display (at gray level value 0), and a gray level 1 that performs white display (at gray level value 15).

When the display is rewritten using the 16-gray level driving scheme α, because gray level values before rewriting can be in 16 ways, and gray level values after rewriting can be in 16 ways, 16×16=256 ways of writing patterns are present. Because driving waveforms are set corresponding to the respective rewriting patterns, the driving scheme α includes 256 driving waveforms. Similarly, the 8-gray level driving scheme β includes 64 driving waveforms corresponding to 8×8=64 ways of writing patterns, the 4-gray level driving scheme γ includes 16 driving waveforms corresponding to 4×4=16 ways of writing patterns, and the 2-gray level driving scheme δ includes 4 driving waveforms corresponding to 2×2=4 ways of writing patterns. When the number of gray levels to be displayed by the electrophoretic display device 1 wants to be changed (in other words, when the display mode wants to be changed), it can be controlled by switching the driving scheme among the driving schemes α, β, γ and δ.

Note that the optical states (gray level values 0, 4, 11, 15) corresponding to the four gray levels (0-3) that can be realized by the driving scheme γ are equal to some of the optical states (gray level values 0, 2, 4, 6, 9, 11, 13, 15) corresponding to the 8 gray levels (0-7) that can be realized by the driving scheme β. In other words, all of the four optical states that can be realized by the driving scheme γ can be realized by the driving scheme β.

Similarly, the optical states corresponding to the four gray levels that can be realized by the driving scheme γ are equal to some of the optical states (gray level values 0-15) corresponding to the 16 gray levels (0-15) that can be realized by the driving scheme α. In other words, all of the four optical states that can be realized by the driving scheme γ can be realized by the driving scheme α.

Similarly, the optical states (gray level values 0, 2, 4, 6, 11, 13, 15) corresponding to the eight gray levels that can be realized by the driving scheme β are equal to some of the optical states (gray level values 0-15) corresponding to the 16 gray levels (0-15) that can be realized by the driving scheme α. In other words, all of the eight optical states that can be realized by the driving scheme β can also be realized by the driving scheme α.

In this manner, by setting the optical states realized by a driving scheme including a smaller number of display gray levels to be realized by a driving scheme including a greater number of display gray levels (in other words, by setting gray level values to be displayed by a driving scheme including a smaller number of display gray levels to be displayed by a driving scheme including a greater number of display gray levels), driving schemes can be switched without any deficiency, such as, gray level shifts or the like. In the above description, the driving scheme γ may correspond to a "first driving scheme," the driving scheme β may correspond to a "second driving scheme" and the driving scheme α may correspond to a "third driving scheme."

FIG. 11 shows four weight tables to be used to decide integrated values W in the driving schemes α-δ. When multiple driving schemes are mutually switched and used, weight tables are also provided for the corresponding driving schemes, respectively, as shown in FIG. 11.

For the driving scheme α, integrated values W of driving waveforms are decided using the leftmost weight table in FIG. 11. Similarly, the second weight table from the left in FIG. 11 is used for the driving scheme β, the second weight table from the right in FIG. 11 is used for the driving scheme γ, and the rightmost weight table in FIG. 11 is used for the driving scheme δ.

In these four weight tables shown in FIG. 11, weight values WHT corresponding to the same gray levels are mutually equal. By so doing, the relation of W(A→B)=−W(B→A) can be maintained before and after changing the driving scheme, and the DC balance can be regulated.

Voltage application methods using the driving schemes will be described with reference to FIGS. 12 to 15. FIG. 12 is an illustration showing a concept of a voltage application method when a gray level 0 (black display) is rewritten to a gray level 1 (white display) in the two-value driving scheme δ. FIG. 13 is an illustration showing a concept of a voltage application method when the gray level 1 (white display) is rewritten to the gray level 0 (black display) in the two-value driving scheme δ. For these rewriting operations, the rightmost weight table in FIG. 11 is used to decide the integrated value W. More specifically, the integrated value W in rewriting from the gray level 0 to 1 is obtained by Expression (7) as follows.

$$
\begin{aligned}
W(0 \to 1) &= -(WHT(1) - WHT(0)) \times VSH \\
&= -(10 - 0) \times VSH \\
&= -10VSH
\end{aligned} \tag{7}
$$

Also, the integrated value W in rewriting from the gray level 1 to 0 is obtained by Expression (8) as follows.

$$
\begin{aligned}
W(1 \to 0) &= -(WHT(0) - WHT(1)) \times VSH \\
&= -(0 - 10) \times VSH \\
&= 10VSH
\end{aligned} \tag{8}
$$

Based on the above, in FIG. 12, Phase P in which the drive voltage +VSH is impressed is set to two frames, Phase A in which the drive voltage −VSH is impressed is set to 12 frames, and the integrated value W assumes −10 VSH. Similarly, in FIG. 13, Phase A in which the drive voltage −VSH is impressed is set to two frames, Phase B in which the drive voltage +VSH is impressed is set to 12 frames, and the integrated value W assumes 10 VSH.

On the other hand, FIG. 14 is an illustration showing a concept of a voltage application method when the gray level 0 (black display) is rewritten to the gray level 7 (white display) in the 8-value driving scheme β. FIG. 15 is an illustration showing a concept of a voltage application method when the gray level 7 (white display) is rewritten to the gray level 0 (black display) in the 8-value driving scheme β. For these rewriting operations, the second weight table from the left in FIG. 11 is used to decide integrated values W. More specifically, the integrated value W in rewriting from the gray level 0 to 7 is obtained by Expression (9) as follows.

$$
\begin{aligned}
W(0 \to 7) &= -(WHT(7) - WHT(0)) \times VSH \\
&= -(10 - 0) \times VSH \\
&= -10VSH
\end{aligned} \tag{9}
$$

Also, the integrated value W in rewriting from the gray level 7 to 0 is obtained by Expression (10) as follows.

$$
\begin{aligned}
W(7 \to 0) &= -(WHT(0) - WHT(7)) \times VSH \\
&= -(0 - 10) \times VSH \\
&= 10VSH
\end{aligned} \tag{10}
$$

Based on the above, in FIG. 14, Phase P in which the drive voltage +VSH is impressed is set to two frames, Phase A in which the drive voltage −VSH is impressed is set to 12 frames, and the integrated value W assumes −10 VSH. Similarly, in FIG. 15, Phase A in which the drive voltage −VSH is impressed is set to two frames, Phase B in which the drive voltage +VSH is impressed is set to 12 frames, and the integrated value W assumes 10 VSH.

In this manner, the integrated values W in the transition between the same optical states in different driving schemes are mutually equal. In other words, while the integrated value W(0→1) when changing from black (gray level value 0) to white (gray level value 15) in the driving scheme δ is −10 VSH, the integrated value W(0→7) when changing from black (gray level value 0) to white (gray level value 15) in the driving scheme β is also −10 VSH. Similarly, while the integrated value W(1→0) when changing from white (gray level value 15) to black (gray level value 0) in the driving scheme δ is 10 VSH, the integrated value W(7→0) when changing from white (gray level value 15) to black (gray level value 0) in the driving scheme β is also 10 VSH.

The DC balance can be adjusted by the setting described above before and after the driving scheme is changed. For example, even in the case where the white display is rewritten to the black display by the driving scheme δ as shown in FIG. 15, after the black display has been rewritten to the white display by the 2-value driving scheme δ as shown in FIG. 12, the DC balance can be maintained by the integrated values W of impressed voltages in total being counterbalanced.

Comparison Example 1

As a comparison example 1 to show the superiority of the above-described embodiment, a method of voltage application where weight values WHT of weight tables are not made even between plural driving schemes is described. FIG. 16 and FIG. 17 show weight tables of a 8-value driving scheme and a 2-value driving scheme, respectively. Weight values corresponding to white are different from each other in these weight tables. More specifically, in the weight table in FIG. 16, the weight value W (7) corresponding to white is 12, while, in the weight table in FIG. 17, the weight value W (1) corresponding to white is 10. Therefore, the integrated value W when rewriting from black to white is −12 VSH according to the 8-value driving scheme based on FIG. 16, and −10 VSH according to the 2-value driving scheme based on FIG. 17, which are mutually different. Also, the integrated value W when rewriting from white to black is 12 VSH according to the 8-value driving scheme based on FIG. 16, and 10 VSH according to the 2-value driving scheme based on FIG. 17, which are mutually different.

FIGS. 18 and 19 are illustrations showing a concept of a voltage application method by the 8-value driving scheme in which the period of each phase is set based on the weight table shown in FIG. 16. FIG. 18 shows the case of rewriting black to white where three frames are provided for Phase P, and 15 frames are provided for Phase A. According to the voltage application method shown in FIG. 18, the total number of frames is 18, and the integrated value W is −12 VSH. FIG. 19 shows the case of rewriting white to black where three frames are provided for Phase A and 15 frames are provided for Phase B. According to the voltage application method shown in FIG. 19, the total number of frames is 18, and the integrated value W is 12 VSH.

FIGS. 20 and 21 are illustrations showing a concept of a voltage application method by the 2-value driving scheme in which the period of each phase is set based on the weight table shown in FIG. 17. FIG. 20 shows the case of rewriting black to white where two frames are provided for Phase P, and 12 frames are provided for Phase A. According to the voltage application method shown in FIG. 20, the total number of frames is 14, and the integrated value W is −10 VSH. FIG. 21 shows the case of rewriting white to black where two frames are provided for Phase A and 12 frames are provided for Phase B. According to the voltage application method shown in FIG. 21, the total number of frames is 14, and the integrated value W is 10 VSH.

When weight values WHT of weight tables are not made even between plural driving schemes, as in the comparison example 1, it is difficult to regulate the DC balance before and after the driving scheme is changed. For example, when a black display is rewritten to a white display by the 8-value driving scheme (the integrated value W=−12 VSH) as shown in FIG. 18, then the driving scheme is switched to the 2-value driving scheme, and the white display is rewritten to a black display by the 2-value driving scheme (the integrated value W=10 VSH) as shown in FIG. 21, the integrated values W of applied voltages in total become −2 VSH and therefore are not counterbalanced, such that the DC balance cannot be maintained.

In a driving scheme including a relatively large number of displayable gray levels, the total number of frames increases because the driving waveform becomes complex, and weight values WHT of a weight table would likely become greater. Therefore, unless special contrivance is implemented, a trouble occurs in that weight values WHT of the weight tables become uneven between plural driving schemes, like this comparison example 1, and the DC balance collapses. In contrast, in accordance with the embodiment described above, this trouble can be avoided through mutually equating integrated values W at the transition between the same optical states in different driving schemes.

Comparison Example 2

As a comparison example 2 to show the superiority of the above-described embodiment, an example in which optical states of intermediate gray levels are not made even between display modes having different numbers of gray levels is described.

FIG. 22 is a table showing the relation between selectable gray levels in four driving schemes capable of displaying mutually different numbers of gray levels and the gray levels displayed at the gray levels. In FIG. 22, the distribution of gray levels in a 4-value driving scheme γ2 is different from that of the driving scheme γ in FIG. 10. In the driving scheme γ2 in FIG. 22, the distribution of gray level values is decided such that the gray level values at four gray levels are arranged at equal intervals. As a result, the optical states (gray level values) at the gray levels 1 and 2 in the driving scheme γ2 do not concur with the optical states (gray level values) at any of the gray levels in the 8-value driving scheme δ. If the optical states realized by a driving scheme having a smaller number of displayable gray levels are set so as not to be realized by a driving scheme having a greater number of displayable gray levels, equal optical states cannot be obtained before and after the driving scheme is switched, which results in a defect in display. Also, because of the different optical states before and after switching of the driving scheme, a defect would occur in that the DC balance cannot be maintained.

In contrast, in the embodiment described above, the optical states realized by a driving scheme having a smaller number of displayable gray levels are set in a manner to be realized by a driving scheme having a greater number of displayable gray levels, whereby these defects can be avoided.

Modification examples of the embodiment described above will be described below.

Modification Example 1

FIG. 23 is a table showing the relation between selectable gray levels in four driving schemes capable of displaying mutually different numbers of gray levels and the gray levels displayed at the gray levels. FIG. 24 shows four weight tables to be used to decide the integrated values W in the respective driving schemes in FIG. 23. In FIG. 23, the distribution of gray levels in an 8-value driving scheme β2 and a 4-value driving scheme γ2 is different from those of the driving schemes β and γ in FIG. 10, respectively, but the optical states realized by a driving scheme having a smaller number of displayable gray levels are set in a manner to be realized by a driving scheme having a greater number of displayable gray levels. Also, in the four weight tables in FIG. 24, weight values WHT corresponding to the same gray levels are mutually equal.

In this manner, by satisfying the condition in which weight values WHT corresponding to the same gray levels in weight tables are set to be mutually equal, and the optical states realized by a driving scheme having a smaller number of displayable gray levels are set in a manner to be realized by a driving scheme having a greater number of displayable gray levels, the distribution of gray levels in each display mode can be arbitrarily decided.

Modification Example 2

In the embodiment described above, voltages corresponding to white are impressed in Phase A, Phase C and Phase N, and voltages corresponding to black are impressed in Phase B and Phase P. However, their polarity may be reversed. In other words, a voltage corresponding to black may be impressed in Phase A, Phase C and Phase N, and a voltage corresponding to white may be impressed in Phase B and Phase P.

In addition, the gray level to be realized in each phase may be made selectable between white and black. More specifically, the gray level to be realized in each phase may not be fixed, but may be made suitably selectable between white and black according to the gray level before rewriting or according to the target gray level. As a result, intermediate gray levels can be more effectively displayed. However, this arrangement should be made under condition that the voltage to be impressed in Phase A and Phase C has a reserves polarity with respect to the voltage to be impressed in Phase B. Similarly, the voltage to be impressed in Phase P should have a reverse polarity with respect to the voltage to be impressed in Phase N.

Furthermore, in the embodiment described above, an example is described in which the white particles 82 are negatively charged, and the black particles 83 are positively charged. However, the white particles 82 may be positively charged, and the black particles 83 may be negatively charged. Also, the electrophoretic element 23 is not limited to the configuration that has the microcapsules 80, and may have a configuration in which electrophoretic dispersion medium and electrophoretic particles are stored in spaces divided by partition walls. Though the electro-optic device having the electrophoretic element 23 is described as an example of the electro-optic device, the invention is not limited to such a configuration. The electro-optic device may be an electro-optic device that uses, for example, electronic powder particles.

Electronic Apparatus

Next, electronic apparatuses using the above-described electrophoretic display device will be described with reference to FIGS. 25 and 26. Examples in which the above-described electrophoretic display device 1 is applied to an electronic paper and an electronic notepad will be described.

Figure 25:
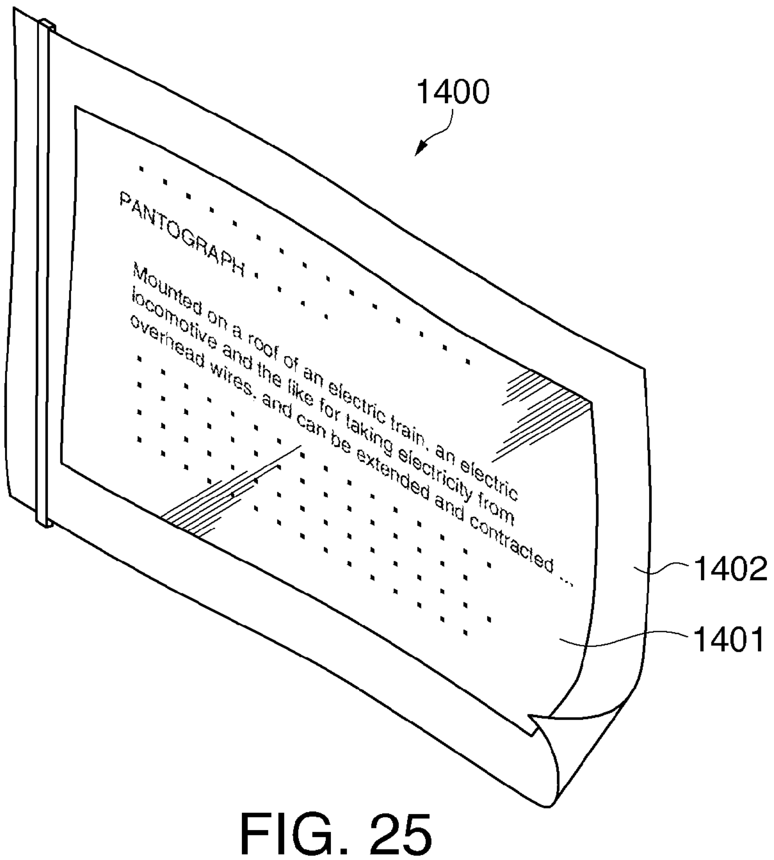
FIG. 25 is a perspective view showing a configuration of an electronic paper that is an example of an electronic apparatus using the electro-optic device.

FIG. 25 is a perspective view showing the configuration of an electronic paper 1400. As shown in FIG. 25, the electronic paper 1400 is equipped with the electrophoretic display device 1 in accordance with the embodiment described above as a display section 1401. The electronic paper 1400 is flexible and includes a sheet body 1402 composed of a rewritable sheet with texture and flexibility similar to those of ordinary paper.

Figure 26:
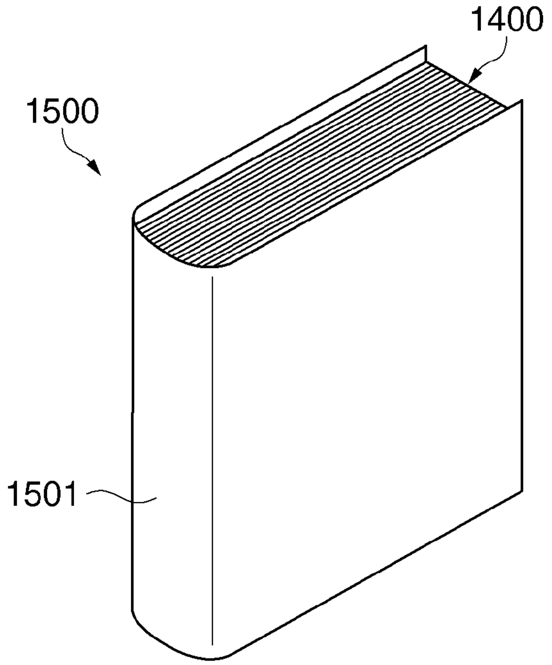
FIG. 26 is a perspective view showing a configuration of an electronic notepad that is an example of an electronic apparatus using the electro-optic device.

FIG. 26 is a perspective view showing the configuration of an electronic notepad 1500. As shown in FIG. 26, the electronic notepad 1500 is configured such that multiple sheets of electronic paper 1400 shown in FIG. 25 are bundled and placed between covers 1501. The covers 1501 may be equipped with, for example, a display data input device (not shown) for inputting display data transmitted from, for example, an external apparatus. Accordingly, display contents can be changed or updated according to the display data while the multiple sheets of electronic paper are bundled together.

The electronic paper 1400 and the electronic notepad 1500 described above are equipped with the electrophoretic display device 1 in accordance with the embodiment of the invention described above, such that high quality image display can be performed. In addition to the above, the electrophoretic display device 1 in accordance with the embodiment described above is also applicable to display sections of other electronic apparatuses, such as, wrist watches, cellular phones, portable audio apparatuses and the like.

The entire disclosure of Japanese Patent Application No. 2012-164465, filed Jul. 25, 2012 is expressly incorporated by reference herein.

What is claimed is:

1. A method for controlling an electro-optic device having a display section including a plurality of pixels provided at positions corresponding to intersections between mutually intersecting plural scanning lines and plural data lines, each of the pixels including electro-optic material placed between mutually opposing pixel electrode and counter electrode, and capable of assuming a first limit optical state, a second limit optical state and a plurality of intermediate optical states between the first limit optical state and the second limit optical state, and a drive part that supplies, for displaying an image corresponding to image data at the display section, voltage pulses according to the image data to the pixel electrode of each of the pixels in a plurality of frame periods, the method comprising:

switching between a first driving scheme for changing an optical state between a-number of optical states among an optical state group composed of the first limit optical state, the second limit optical state and the plurality of intermediate optical states and a second driving scheme for changing an optical state between b-number of optical states (b>a) among the optical state group, in the first driving scheme, an integrated value W (A→B) that is an integrated value of drive voltage and drive time when changing the pixel from an optical state A included in the a-number of optical states to an optical state B, and an integrated value W (B→A) that is an integrated value of drive voltage and drive time when changing the pixel from the optical state B to the optical state A satisfying a relation of W (A→B)=−W (B→A), and the integrated value W (A→B) and the integrated value W (B→A) for the optical state A and the optical state B in the second driving scheme being equal to the integrated value W (A→B) and the integrated value W (B→A) in the first driving scheme, respectively.

2. The method for controlling an electro-optic device according to claim 1, wherein the a-number of optical states in the first driving scheme are selected to be equal to corresponding ones of the b-number of optical states in the second driving scheme.

3. The method for controlling an electro-optic device according to claim 2, comprising switching between the first driving scheme, the second driving scheme and a third driving scheme to change the optical state between c-number of optical states (c>b) among the optical state group, the a-number of optical states in the first driving scheme being selected to be equal to corresponding ones of the c-number of optical states in the third driving scheme.

4. The method for controlling an electro-optic device according to claim 3, wherein the integrated value W (A→B) and the integrated value W (B→A) for the optical state A and the optical state B in the third driving scheme are equal to the integrated value W (A→B) and the integrated value W (B→A) in the first driving scheme, respectively.

5. The method for controlling an electro-optic device according to claim 1, wherein an integrated value W (Li→Lj) of drive voltage and drive time for arbitrary optical states Li and Lj are set using a weight table having one weight value for each reference optical state, and the integrated value W (Li→Lj) is decided to be proportional to the value of WHT (Lj)−WHT (Li) where WHT (Li) is the weight value of an optical state Li and WHT (Lj) is the weight value of an optical state Lj in the weight table.

6. The method for controlling an electro-optic device according to claim 5, wherein the weight table is provided for each of the driving schemes, and the weight values corresponding to the same optical states are mutually equal in the weight tables of the driving schemes, respectively.

7. A control device for controlling an electro-optic device comprising:

a display section including a plurality of pixels provided at positions corresponding to intersections between mutually intersecting plural scanning lines and plural data lines, each of the pixels including electro-optic material placed between mutually opposing pixel electrode and counter electrode, and capable of assuming a first limit optical state, a second limit optical state and a plurality of intermediate optical states between the first limit optical state and the second limit optical state;

a drive part that supplies, for displaying an image corresponding to image data at the display section, voltage pulses according to the image data to the pixel electrode of each of the pixels in a plurality of frame periods; and a control part for controlling the electro-optic device through switching between a first driving scheme for changing an optical state between a-number of optical states among an optical state group composed of the first limit optical state, the second limit optical state and the plurality of intermediate optical states and a second driving scheme for changing an optical state between b-number of optical states (b>a) among the optical state group, in the first driving scheme, an integrated value W (A→B) of drive voltage and drive time when changing the pixel from an optical state A included in the a-number of optical states to an optical state B, and an integrated value W (B→A) of drive voltage and drive time when changing the pixel from the optical state B to the optical state A satisfying a relation of W (A→B)=−W (B→A), and the integrated value W (A→B) and the integrated value W (B→A) for the optical state A and the optical state B in the second driving scheme being equal to the integrated value W (A→B) and the integrated value W (B→A) in the first driving scheme, respectively.

8. The control device according to claim 7, wherein the a-number of optical states in the first driving scheme are selected to be equal to corresponding ones of the b-number of optical states in the second driving scheme.

9. The control device according to claim 8, wherein the control part switches between the first driving scheme, the second driving scheme and a third driving scheme for changing the optical state among c-number of optical states (c>b) in the optical state group, and the a-number of optical states in the first driving scheme are selected to be equal to corresponding ones of the c-number of optical states in the third driving scheme.

10. The control device according to claim 9, wherein the integrated value W (A→B) and the integrated value W (B→A) for the optical state A and the optical state B in the third driving scheme are equal to the integrated value W (A→B) and the integrated value W (B→A) in the first driving scheme, respectively.

11. An electro-optic device comprising the control device for controlling an electro-optic device recited in claim 7.

12. An electronic apparatus comprising the electro-optic device recited in claim 11.

* * * * *